No. 751,329. PATENTED FEB. 2, 1904.
M. P. McLAUGHLIN.
HOSE CLAMP.
APPLICATION FILED JULY 20, 1903.
NO MODEL.

Witnesses
Inventor:
M. P. McLaughlin
by Wright, Brown & Quinby
Attys.

No. 751,329.

Patented February 2, 1904.

UNITED STATES PATENT OFFICE.

MILTON P. McLAUGHLIN, OF WAKEFIELD, MASSACHUSETTS.

HOSE-CLAMP.

SPECIFICATION forming part of Letters Patent No. 751,329, dated February 2, 1904.

Application filed July 20, 1903. Serial No. 166,220. (No model.)

*To all whom it may concern:*

Be it known that I, MILTON P. MCLAUGHLIN, of Wakefield, in the county of Middlesex and State of Massachusetts, have invented certain new and useful Improvements in Hose-Clamps, of which the following is a specification.

This invention relates to hose-clamps; and its object is to provide a simple and compact structure which may be easily fitted and adjusted to the parts which it connects.

A further object is to secure increased durability and cheapness of construction.

Figure 1:
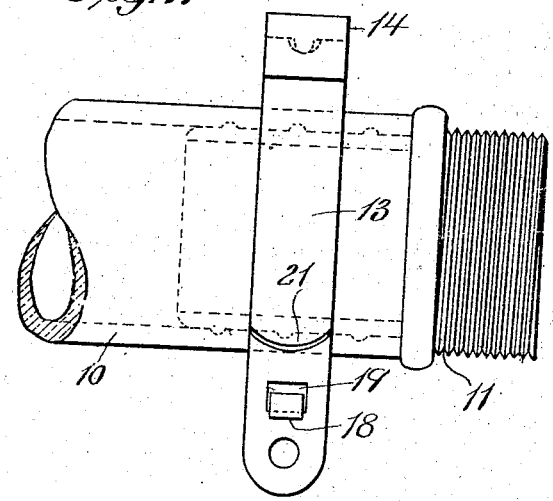
Figure 2:
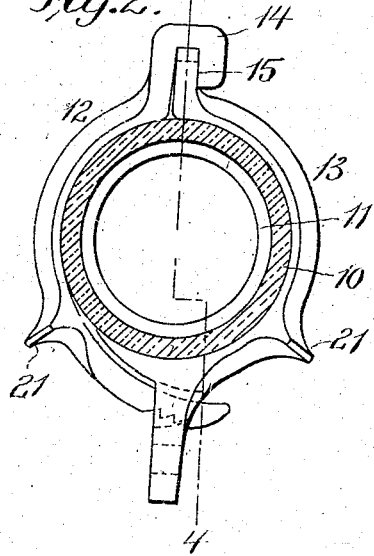
Figure 3:
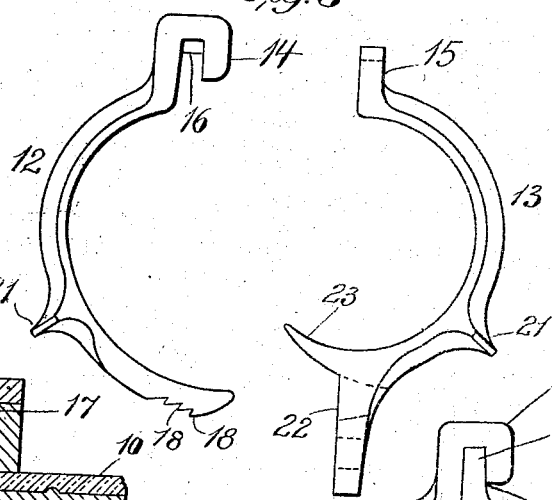
Figure 4:
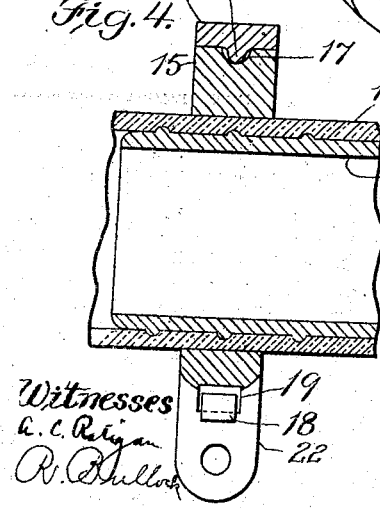
Figure 5:
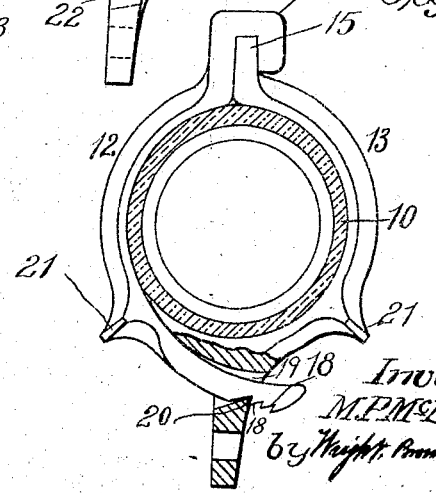

Of the accompanying drawings, Figure 1 represents a side elevation of a hose and conduit member with my improved hose-clamp applied thereto. Fig. 2 represents a transverse section of said parts. Fig. 3 represents a view showing the segments of the clamp separated. Fig. 4 represents a section on line 4 4 of Fig. 2. Fig. 5 represents a view similar to Fig. 2, showing the clamp closely engaged with the hose.

The same reference characters indicate the same parts in all the figures.

In the drawings, 10 is the flexible hose, and 11 is the conduit member to which said hose is secured by the clamp. The clamp is composed of two halves or segments 12 13, which together form a ring to encircle the hose 10. The segment 12 is formed at one end with a hook 14, whose recess faces inwardly, and the corresponding end of the segment 13 is formed with a radial projection 15, adapted to enter said recess, the said hook and projection being formed integrally on the respective segments and constituting interlocking members which may be connected and separated by a relative radial and pivotal movement of the segments, the said members acting as a hinge. The members 14 15 are also formed, respectively, with a tooth 16 and a notch 17, occupied thereby, said tooth and notch constituting permanent (that is, integral or non-adjustable) devices locking with each other by the movement of fitting the projection 15 into the hook 14, whereby the axial displacement of the segments at this end is prevented when the members 14 15 are interlocked.

The segment 12 on its lower end, as viewed in the drawings, is provided with a nose having a series of ratchet-teeth 18 formed thereon, said nose being adapted to project through an aperture 19, formed in the end of the segment 13, and at the bottom of which is a tooth 20, coöperating with the teeth 18.

21 21 are lugs or projections formed on the respective segments 12 13 for extraneous engagement by a vise or other tool or by the operator's hands, whereby the locking members 18 20 may be forced into engagement. Beyond the radial projection 22, in which the aperture 19 is formed, the segment 13 has a tongue extension 23, which forms a filler between the nose at the lower end of the segment 12 and the hose 10.

One of the advantages of my invention is the facility with which the members of the clamp may be disengaged. After the segments have been locked together, as shown in Fig. 5, the jaws of a vise or similar tool may be placed against the member 14 and the nose at the lower end of the segment 12, respectively, and the slight spring of the metal will allow the teeth 18 to be separated from tooth 20 and permit the tongue on segment 18 to be withdrawn from the aperture 19.

It is apparent that by engaging the members 14 15 in an evident manner and inserting the nose of the segment 12 through the aperture 19 and applying sufficient pressure to the lugs 21 the tooth 20 may be engaged with some one of the teeth 18, which latter constitute a plurality of set or predetermined locking-divisions. The series of teeth 18 allows for a certain range of adjustability in the diameter of the clamp, according to the diameter or resiliency of the hose. The nose-bearing teeth 18 and the projection 22 constitute overlapping members which lock together automatically by a slight radial movement additional to the circumferential closing movement, by which the said members are adjusted to their different locking positions.

In fitting the clamp to a hose the hook 14 and projection 15 are interlocked, as above indicated, by a partly radial and partly pivotal relative movement of the clamps, and the pivotal part of this interlocking movement is also the movement whereby the locking members 18 20 are brought into their successive locking positions. This clamp can therefore be applied and released very quickly, which advantage, combined with its simplicity and absence of liability to breakage, makes it particularly desirable for railway-work. It is obvious that other forms of positive locking members having a plurality of set or predetermined locking divisions could be substituted for the members 18 20, &c., without departing from the spirit of the invention.

It will be understood that when the two members of the clamp are to be applied to place the movements which interlock the recessed hook 14 and the projection 15 result in bringing the two locking devices at the other end of the two members into sufficiently accurate relative positions to enable them to automatically engage each other without the employment of particular care to see that one enters the other properly. This is a material advantage because of the saving of time in applying the clamp.

I claim—

1. A hose-clamp comprising segments having at one end interlocking members one of which is a hook whose recess faces inwardly, the other being a projection adapted to enter said recess by an outward movement, said members having permanent complemental devices locking against relative axial movement by the fitting together of said members, and means for locking together the opposite ends of said segments.

2. A hose-clamp comprising segments having at one end respectively a hook whose recess faces inwardly and a projection to enter said hook, said members interlocking by a movement of the segments partly radial and partly pivotal, and adjustable positive locking means at the other end of the members having a plurality of set or predetermined locking-divisions giving different diameters of aperture to the clamp, the arrangement being such that the ends of the segments bearing said locking means are brought successively into their several predetermined locking positions by a continuation of the said interlocking movement of the segments.

In testimony whereof I have affixed my signature in presence of two witnesses.

MILTON P. McLAUGHLIN.

Witnesses:
R. M. PIERSON,
A. C. RATIGAN.